(12) United States Patent
Ji et al.

(10) Patent No.: US 11,838,622 B2
(45) Date of Patent: Dec. 5, 2023

(54) IMAGE PROCESSING METHOD, APPARATUS, DEVICE, AND STORAGE MEDIUM

(71) Applicant: Beijing Bytedance Network Technology Co., Ltd., Beijing (CN)

(72) Inventors: Jingyu Ji, Beijing (CN); Yitian Xu, Beijing (CN); Wang Xu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/090,114

(22) Filed: Dec. 28, 2022

(65) Prior Publication Data

US 2023/0188834 A1 Jun. 15, 2023

Related U.S. Application Data

(63) Continuation of application No. PCT/CN2021/114880, filed on Aug. 27, 2021.

(30) Foreign Application Priority Data

Aug. 31, 2020 (CN) .......................... 202010900860.6

(51) Int. Cl.
*G06T 7/11* (2017.01)
*H04N 23/60* (2023.01)
(Continued)

(52) U.S. Cl.
CPC .............. *H04N 23/64* (2023.01); *G06T 3/60* (2013.01); *G06T 7/0002* (2013.01); *G06T 7/11* (2017.01);
(Continued)

(58) Field of Classification Search
CPC ...... H04N 23/64; H04N 5/272; H04N 23/611; H04N 23/632; H04N 23/634; H04N 23/80;
(Continued)

(56) References Cited

U.S. PATENT DOCUMENTS

2014/0185957 A1* 7/2014 Kim ........................ G06T 11/00
382/283
2016/0373646 A1 12/2016 Fredlund et al.
(Continued)

FOREIGN PATENT DOCUMENTS

CN 102542255 A 7/2012
CN 105279473 A 1/2016
(Continued)

OTHER PUBLICATIONS

International Search Report issued in International Patent Application No. PCT/CN2021/114880 dated Oct. 29, 2021.
Extended European Search Report in EP21860503.8, dated Jun. 27, 2023, 8 pages.
Ptucha et al., "Auto zoom crop from face detection and facial features," Computational Imaging XI, SPIE, Feb. 2013, vol. 8657, 10 pages.

*Primary Examiner* — Stephen P Coleman
(74) *Attorney, Agent, or Firm* — ARENTFOX SCHIFF LLP (57) ABSTRACT

Provided are an image processing method, a device, and a storage medium, the method comprising: performing human face detection on a first image, and obtaining position information for each human face in the first image, then determining whether the first image conforms to a multi-person composition rule on the basis of the position information of each human face in the first image; and cropping the first image based on the position information of each face in the first image to obtain a processed image, in response to the first image not complying with the multi-person composition rule.

15 Claims, 3 Drawing Sheets

(51) Int. Cl.
*G06T 7/70* (2017.01)
*H04N 23/80* (2023.01)
*H04N 23/63* (2023.01)
*H04N 23/611* (2023.01)
*G06T 3/60* (2006.01)
*G06T 7/00* (2017.01)
*H04N 5/272* (2006.01)

(52) U.S. Cl.
CPC .............. *G06T 7/70* (2017.01); *H04N 5/272* (2013.01); *H04N 23/611* (2023.01); *H04N 23/632* (2023.01); *H04N 23/634* (2023.01); *H04N 23/80* (2023.01); *G06T 2207/20132* (2013.01); *G06T 2207/30168* (2013.01); *G06T 2207/30201* (2013.01)

(58) Field of Classification Search
CPC . G06T 3/60; G06T 7/0002; G06T 7/11; G06T 7/70; G06T 2207/20132; G06T 2207/30168; G06T 2207/30201
USPC ....................................................... 348/222.1
See application file for complete search history.

(56) References Cited

U.S. PATENT DOCUMENTS

2017/0208243 A1 7/2017 Masad et al.
2018/0096449 A1* 4/2018 Racz ...................... G06T 11/00

FOREIGN PATENT DOCUMENTS

| | | |
|---|---|---|
| CN | 105893981 A | 8/2016 |
| CN | 107358207 A | 11/2017 |
| CN | 107592454 A | 1/2018 |
| CN | 108009998 A | 5/2018 |
| CN | 108289169 A | 7/2018 |
| CN | 108460343 A | 8/2018 |
| CN | 109657526 A | 4/2019 |
| CN | 110175558 A | 8/2019 |
| CN | 110298376 A | 10/2019 |
| CN | 111277759 A | 6/2020 |
| CN | 111524145 A | 8/2020 |
| CN | 112036319 A | 12/2020 |

* cited by examiner

IMAGE PROCESSING METHOD, APPARATUS, DEVICE, AND STORAGE MEDIUM

This application is a continuation application of International Application No. PCT/CN2021/114880, filed on Aug. 27, 2021, which claims priority to Chinese Patent Application No. 202010900860.6, titled "IMAGE PROCESSING METHOD, APPARATUS, DEVICE, AND STORAGE MEDIUM", filed on Aug. 31, 2020 with the China National Intellectual Property Administration (CNIPA), both of which are incorporated herein by reference in their entireties.

FIELD

The present disclosure relates to the field of image data processing, and in particular, to an image processing method, apparatus, device, and storage medium.

BACKGROUND

With the diversified development of image processing, people have increased requirements on image quality. The image quality may be evaluated from local details and the whole of the image.

At present, the demand for image processing is no longer limited to the processing of detailed effects. People start to pay attention to whether an overall effect of the image conforms to people's aesthetic habits.

Therefore, how to improve the image quality by improving an overall effect of an image is a technical problem that needs to be solved urgently at present.

SUMMARY

In order to solve the above technical problem or at least partially solve the above technical problem, an image processing method, apparatus, device and storage medium are provided in the present disclosure, so as to improve the efficiency of image processing.

In a first aspect, an image processing method is provided in the present disclosure.

The method includes:
  performing face detection on a first image, and acquiring position information of each face in the first image;
  determining, based on the position information of each face in the first image, whether the first image complies with a multi-person composition rule; and
  cropping the first image based on the position information of each face in the first image to obtain a processed image, in response to the first image not complying with the multi-person composition rule.

In an embodiment, before performing face detection on the first image, the method further includes:
  detecting whether a target object in a second image is in a vertical state, to determine whether the second image is in a scene horizontal state; and
  rotating the second image to acquire the first image, in response to the second image being not in the scene horizontal state.

In an embodiment, the target object includes multiple sub-objects. The detecting whether the target object in the second image is in the vertical state, to determine whether the second image is in the scene horizontal state includes:
  detecting whether each of the multiple sub-objects in the second image is in the vertical state, to determine whether the second image is in the scene horizontal state.

In an embodiment, the target object includes a body part and a face part. The detecting whether the target object in the second image is in the vertical state, to determine whether the second image is in the scene horizontal state includes:
  detecting whether the body part and the face part of a same person in the second image are both in the vertical state, to determine whether the second image is in the scene horizontal state.

In an embodiment, before rotating the to-be-processed image to acquire the first image, the method further includes:
  acquiring an offset angle of the target object in the second image relative to a vertical direction, in response to the second image being not in the scene horizontal state;
  The rotating the second image to acquire the first image includes:
  rotating the second image based on the offset angle, to acquire the first image.

In an embodiment, the method further includes:
  displaying a composition prompt, in response to detecting that the first image or the processed image does not meet a correction condition.

In an embodiment, the displaying the composition prompt in response to detecting that the first image or the processed image does not meet the correction condition includes:
  displaying the composition prompt, in response to detecting that a main part is incomplete in the first image; or,
  displaying the composition prompt, in response to detecting that the processed image after zoom-in has a resolution lower than a preset resolution.

In an embodiment, the first image is a current preview image in a preview window of a camera; the method further includes:
  displaying the processed image in the preview window of the camera.

In an embodiment, the displaying the processed image in the preview window of the camera includes:
  displaying the processed image with picture-in-picture form, in the preview window of the camera.

In a second aspect, an image processing apparatus is provided in the present disclosure. The apparatus includes:
  a first determination module, configured to perform face detection on a first image, and acquire position information of each face in the first image;
  a second determination module, configured to determine whether the first image complies with a multi-person composition rule, based on the position information of each face in the first image; and
  a cropping module, configured to crop the first image based on the position information of each face in the first image to obtain a processed image, in response to the first image not complying with the multi-person composition rule.

In a third aspect, a computer-readable storage medium is provided in the present disclosure. The computer-readable storage medium stores instructions which, when being executed on a terminal device, causes the terminal device to implement the above method.

In a fourth aspect, a device is provided in the present disclosure. The device includes: a memory, a processor, and a computer program stored on the memory and executable on the processor. The processor, when executing the computer program, implements the above method.

Compared with the conventional technology, the technical solutions provided by embodiments of the present disclosure have the following advantages.

In the image processing method according to an embodiment of the present disclosure, face detection is first performed on a first image to acquire position information of each face in the first image; then it is determined whether the first image complies with a multi-person composition rule, based on the position information of each face in the first image; and, the first image is cropped based on the position information of each face in the first image to obtain a processed image, in response to the first image not complying with the multi-person composition rule. With the embodiment of the present disclosure, composition of an image is corrected with regards to an overall effect of the image, thereby improving the image quality.

BRIEF DESCRIPTION OF THE DRAWINGS

The accompanying drawings, which are incorporated in and constitute a part of this specification, illustrate embodiments consistent with the present disclosure and together with the description serve to explain the principles of the present disclosure.

In order to more clearly illustrate technical solutions in embodiments of the present disclosure or in the conventional technology, the accompanying drawings to be used in the description of the embodiments or the conventional technology will be briefly introduced below. Obviously, other drawings may be obtained from these drawings by the skilled in the art without any creative effort.

DETAILED DESCRIPTION OF EMBODIMENTS

In order to more clearly understand the above objects, features and advantages of the present disclosure, the solutions of the present disclosure will be further described below. It should be noted that the embodiments of the present disclosure and features in the embodiments may be combined with each other if there is no conflict.

Many specific details are set forth in the following description to facilitate a full understanding of the present disclosure, but there are other ways different from those described herein to implement the present disclosure. Obviously, the embodiments in the specification are only some rather than all of embodiments of the present disclosure.

At present, people have increased requirements on image quality, and people also start to pay attention to whether an overall effect of an image conforms to people's aesthetic habits. Therefore, how to improve the image quality by improving an overall effect of an image is a technical problem that needs to be solved urgently at present.

To this end, an image processing method is provided in the present disclosure. Face detection is first performed on a first image, to acquire position information of each face in the first image. Then it is determined whether the first image complies with a multi-person composition rule, based on the position information of each face in the first image. In response to the first image not complying with the multi-person composition rule, the first image is cropped based on the position information of each face in the first image to obtain a processed image. With the embodiment of the present disclosure, composition of an image is corrected with regards to an overall effect of the image, thereby improving the image quality.

Figure 1:
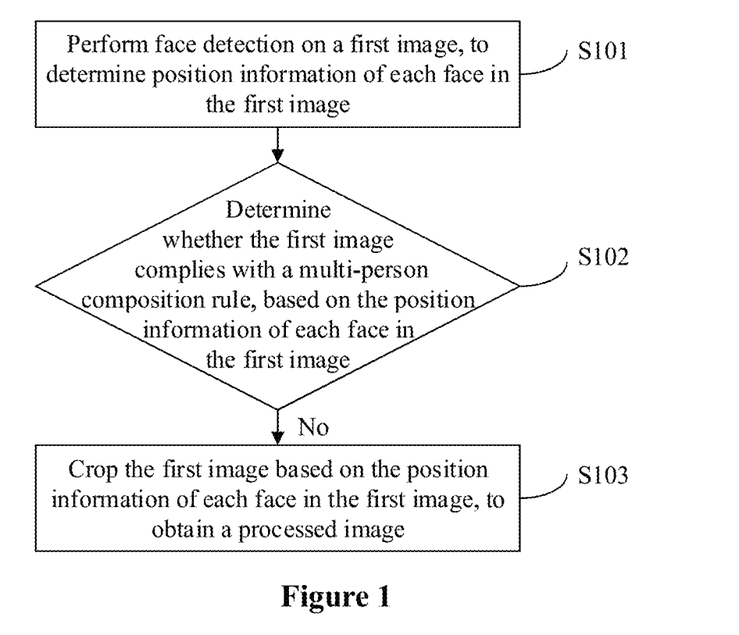
FIG. 1 is a flowchart of an image processing method according to an embodiment of the present disclosure.

Specifically, an image processing method is provided according to an embodiment of the present disclosure provides. Reference is made to FIG. 1, which is a flowchart of an image processing method according to an embodiment of the present disclosure. The method includes the following steps S101 to S103.

In S101, face detection is performed on a first image, and position information of each face in the first image is determined.

In an embodiment of the present disclosure, the first image may be any image with multiple human faces captured. For example, the first image may be a current preview image in a preview window of a camera when taking a photo of multiple persons, or may be the photo of multiple persons taken after pressing a shutter button of the camera.

In an embodiment of the present disclosure, after the first image is determined, face detection is performed on the first image to determine the position information of each face in the first image. The position information of the face may be two-dimensional coordinate information of a center point of the face. The two-dimensional coordinate information may be coordinate information in a coordinate system with the top left corner of the first image as the origin.

In practice, a machine learning model may be used to perform the face detection on the first image, which will not be described in details herein.

In an embodiment, it is considered that composition of an image in which a main part is incomplete generally cannot be corrected through basic correction operations such as rotation and cropping. In this embodiment of the present disclosure, before performing face detection on the first image, it is detected whether a main part of the first image is incomplete. For example, it is detected whether face, body or the like in the first image is incomplete due to camera shooting ways. If it is determined that the main part of the first image is incomplete, subsequent correction operations are not useful to improve the overall effect of the first image. At this time, a composition prompt for the first image may be displayed to a user, so that the user may re-shoot an image based on the composition prompt, so as to obtain an image with an overall effect better than that of the first image.

Figure 2:
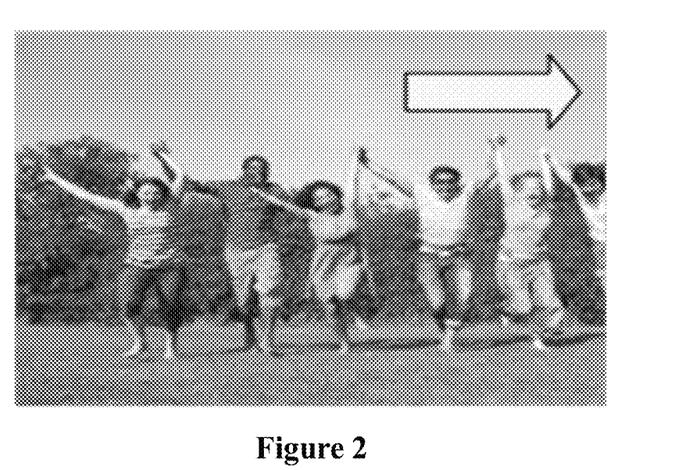
FIG. 2 is a schematic diagram of an image in which a main part is incomplete according to an embodiment of the present disclosure.

FIG. 2 is a schematic diagram of an image in which a main part is incomplete according to an embodiment of the present disclosure. As shown in FIG. 2, a part of a person image on the right side of the image is missing. Therefore, a composition prompt may be displayed according to an embodiment of the present disclosure. For example, the composition prompt may be a right arrow as shown in FIG. 2, which prompts the user to move the camera to retake a better image. Specifically, the right arrow is used to prompt the user to move the camera pose to the right. Moreover, the composition prompt may also prompt to move pose of the person in the image, such as prompting the person to move left, as shown in FIG. 2.

In addition, if it is determined that the main part of the first image is complete, face detection may be performed on the first image, so that the first image is subsequently corrected based on result of the face detection.

In S102, it is determined whether the first image complies with a multi-person composition rule, based on the position information of each face in the first image. S103 is performed in response to the first image not complying with the multi-person composition rule.

In an embodiment of the present disclosure, after acquiring the position information of each face in the first image, it is determined, based on the position information of each face, whether the first image complies with the multi-person composition rule.

In practice, the multi-person composition rule may be "rule of thirds", "rule of centering and being symmetrical", or other composition rule. It is determined, based on the position information of each face, whether the first image complies with at least one type of multi-person composition rule. It is determined that the first image complies with the multi-person composition rule if at least one type of multi-person composition rule is in force; otherwise, it is determined that the first image does not comply with to the multi-person composition rule, and the composition of the first image needs to be corrected.

In an embodiment, the position information of each face in the first image may be inputted into a multi-person composition rule model. It is determined whether the first image complies with at least one type of multi-person composition rule by matching the position information of each face with each rule in the multi-person composition rule model.

In S103, the first image is cropped based on the position information of each face in the first image, to acquire a processed image.

In an embodiment of the present disclosure, if it is determined that the first image does not comply with the multi-person composition rule, the first image is cropped. Specifically, the first image may be cropped based on the position information of each face in the first image. For example, if the position information of each face indicates that each face is on the right side of the first image, and there is no face in most of regions on the left side of the first image, then the regions on the left side of the first image may be cropped, so as to make the overall effect of the processed image better.

In an embodiment, for the processed image after cropping, it may be further determined whether the processed image complies with the multi-person composition rule. Specifically, the position information of each face in the first image is updated based on the cropping of the first image. Then, it is re-determined, based on the updated position information of each face, whether the first image undergone cropping once complies with the multi-person composition rule, until a processed image that complies with the multi-person composition rule is acquired. For the specific determining process, reference may be made to the above description, which is not repeated herein.

In an embodiment, the first image is cropped to acquire the processed image, and the processed image may be zoomed in and displayed so as to facilitate the user to view the processed image. If it is detected that the processed image after zoom-in is not displayed clearly, specifically, the processed image after zoom-in has a resolution lower than a preset resolution, it may indicate that the image quality cannot be improved by cropping the first image. Therefore, a composition prompt for the first image may be displayed according to an embodiment of the present disclosure, so that the user can retake the first image according to the composition prompt.

In the image processing method according to the embodiment of the present disclosure, face detection is first performed on a first image to acquire position information of each face in the first image; then it is determined whether the first image complies with a multi-person composition rule, based on the position information of each face in the first image; and, the first image is cropped based on the position information of each face in the first image to obtain a processed image, in response to the first image not complying with the multi-person composition rule. With the embodiment of the present disclosure, composition of an image is corrected with regards to an overall effect of the image, thereby improving the image quality.

Figure 3:
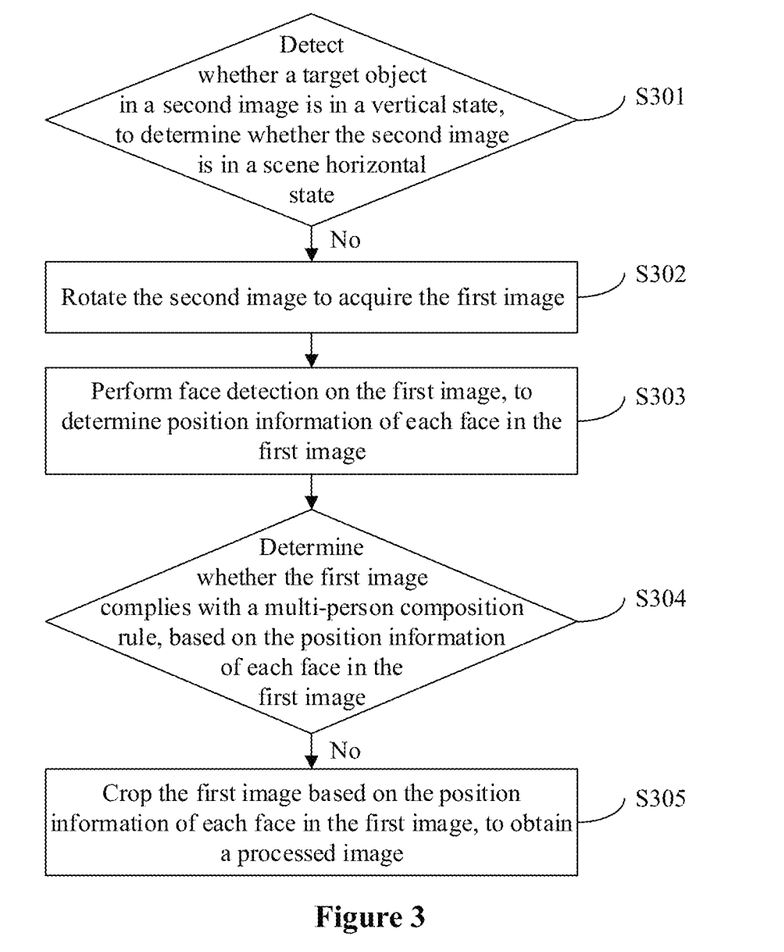
FIG. 3 is a flowchart of an image processing method according to another embodiment of the present disclosure.

In order to further improve the image quality, on the basis of the above-embodiments, an image processing method is further provided in an embodiment of the present disclosure. FIG. 3 is a flowchart of an image processing method according to another embodiment of the present disclosure. Referring to FIG. 3, the method includes the following steps S301 to S305.

In S301, it is detected whether a target object in a second image is in a vertical state, to determine whether the second image is in a scene horizontal state. S302 is performed in response to the second image being not in the scene horizontal state.

In an embodiment of the present disclosure, the second image may be any image with multiple human faces captured. For example, the second image may be a current preview image in a preview window of a camera when taking a photo of multiple persons, or may be the photo of multiple persons taken after pressing a shutter button of the camera.

In an embodiment of the present disclosure, after the second image is determined, it is detected whether the target object in the second image is in a vertical state, and it is determined whether the second image is in a scene horizontal state based on whether the target object is in a vertical state. The scene horizontal state refers to the case that the scene in the image is not in a tilted state. For example, when taking a photo of multiple persons at the beach, if the sea level in the photo is horizontal, then the photo is in the scene horizontal state.

In an embodiment, the target object may be a predetermined specific building in the second image. It may be detected whether the specific building is in the vertical state, to determine whether the second image is in the scene horizontal state.

In an embodiment, the target object may be a body part of a person in the second image. It may be detected whether the body part of the person is in the vertical state, to determine whether the second image is in the scene horizontal state. Specifically, it may be determined whether the body part of the person is in the vertical state based on whether head and feet of the person are on a same vertical line.

In an embodiment, the target object may also be a face part in the second image. It may be detected whether the face part is in a vertical state, to determine whether the second image is in a scene horizontal state. Specifically, it may be determined whether the face part is in a vertical state based on positions of facial features on the face part.

In an embodiment, in order to further improve the accuracy of detection of the scene horizontal state, the target object may be set as a body part and a face part. It may be determined whether second image is in the scene horizontal state based on detection of the vertical state of both the body part and the face part of a same person.

Specifically, it may be detected whether the body part and the face part of the same person in the second image are both in a vertical state, to determine whether the second image is in a scene horizontal state.

In an application scenario, the target object in the second image includes multiple sub-objects. In an embodiment of the present disclosure, it may be determined whether the second image is in the scene horizontal state based on the detection of the vertical state of each sub-object. Specifically, it may be detected whether each of the multiple sub-objects in the second image is in a vertical state, to determine whether the second image is in the scene horizontal state.

In an embodiment, it is detected whether each of the multiple sub-objects in the second image is in a vertical state. It is determined that the second image is in the scene horizontal state if a ratio of a quantity of sub-objects in the vertical state to a total quantity of sub-objects is greater than a preset ratio threshold; otherwise, it is determined that the second image is not in the scene horizontal state.

The multiple sub-objects included in the second image may be face parts of multiple persons in the second image. That is, if the ratio of the quantity of faces in the vertical state to the total quantity of faces is greater than the preset ratio threshold, then it is determined that the second image is in the scene horizontal state; otherwise, it is determined that the second image is not in the scene horizontal state.

In an embodiment, after the second image is determined, it may be first detected whether a main body of the second image is incomplete, and a composition prompt for the second image is displayed if the main body of the second image is incomplete, so that the user may retake an image.

In S302, the second image is rotated to acquire the first image.

In the embodiment of the present disclosure, after it is determined that the second image is not in the scene horizontal state, the second image is rotated, thereby improving the overall effect of the second image.

In an embodiment, in response to determining that the second image is not in the scene horizontal state, an offset angle of the target object in the second image relative to the vertical direction is acquired. Then, the second image is rotated based on the offset angle, to acquire the first image.

In an embodiment, if the target object includes multiple sub-objects, for each of the multiple sub-objects, an offset angle of the sub-object relative to the vertical direction is acquired. Then, an average value of offset angles is calculated, and the second image is rotated based on the average value to acquire the first image.

In an embodiment, if the first image acquired through rotation has an incomplete main body or other problem, and has a reduced image quality, it means that the image quality of the second image cannot be improved by correction. In this case, in the embodiment of the present disclosure, a composition prompt for the second image is displayed, so that the user can retake an image according to the composition prompt.

In S303, face detection is performed on the first image, and position information of each face in the first image is determined.

In S304, it is determined whether the first image complies with a multi-person composition rule, based on the position information of each face in the first image. S302 is performed, in response to the first image not complying with the multi-person composition rule.

In S305, the first image is cropped based on the position information of each face in the first image, to acquire a processed image.

S303 to S305 in the embodiments of the present disclosure may be understood with reference to the descriptions in S101 to S103 in the above embodiment, and details are not repeated here.

In an application scenario, each of the first image in the above embodiment and the second image in this embodiment may be a current preview image in the preview window of the camera. The processed image acquired by the image processing method according to the embodiment of the present disclosure may be displayed in the preview window of the camera. At this time, if the user presses the shutter button, the captured image is the processed image displayed in the preview window of the camera.

In an embodiment, the processed image may be displayed with picture-in-picture form in the preview window of the camera.

In addition, a composition prompt will be displayed in the preview window of the camera, in response to determining that the current preview image in the preview window of the camera does not meet correction conditions, for example, there is an incomplete main part, or there is an incomplete or unclear main part after correction. As shown in FIG. 2, the composition prompt indicates the user to move the camera pose to the right.

Figure 4:
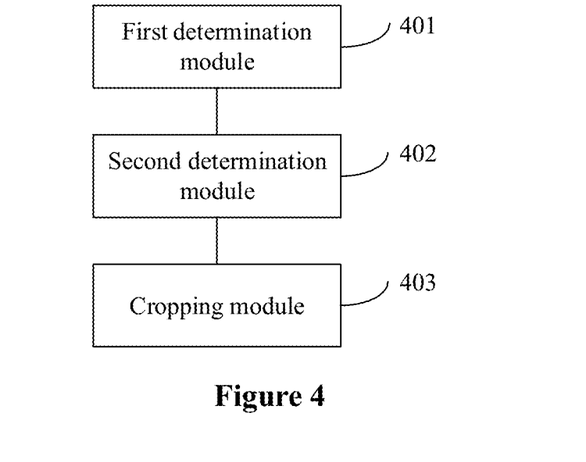
FIG. 4 is a structural block diagram of an image processing apparatus according to an embodiment of the present disclosure.

Based on the same inventive concept as in the above method embodiments, an image processing apparatus is further provided in an embodiment of the present disclosure. FIG. 4 is a schematic structural diagram of an image processing apparatus according to an embodiment of the present disclosure. As shown in FIG. 4, the apparatus includes a first determination module 401, a second determination module 402 and a cropping module 403.

The first determination module 401 is configured to perform face detection on a first image, and acquire position information of each face in the first image. The second determination module 402 is configured to determine, based on the position information of each face in the first image, whether the first image complies with a multi-person composition rule.

The cropping module 403 is configured to crop the first image based on the position information of each face in the first image to obtain a processed image, in response to the first image not complying with the multi-person composition rule.

In an embodiment, the apparatus further includes: a third determination module and a rotation module.

The third determination module is configured to detect whether a target object in a second image is in a vertical state, to determine whether the second image is in a scene horizontal state.

The rotation module is configured to rotate the second image to acquire the first image, in response to the second image being not in the scene horizontal state.

In an embodiment, the target object includes multiple sub-objects;

The third determination module is specifically configured to: detect whether each of the multiple sub-objects in the second image is in the vertical state, so as to determine whether the second image is in the scene horizontal state.

In an embodiment, the target object includes a body part and a face part;

The third determination module is specifically configured to: detect whether a body part and a face part of a same person in the second image are both in the vertical state, to determine whether the scene of the second image is in the horizontal state.

In an embodiment, the apparatus further includes an acquisition module;

The acquisition module is configured to acquire an offset angle of the target object in the second image relative to a vertical direction, in response to the second image being not in the scene horizontal state;

Correspondingly, the rotation module is specifically configured to: rotate the second image based on the offset angle, to acquire the first image.

In an embodiment, the apparatus further includes a first display module. The first display module is configured to display a composition prompt, in a case that the first image or the processed image does not meet a correction condition.

In an embodiment, the first display module includes: a first display sub-module or a second display sub-module;

The first display sub-module is configured to display a composition prompt, in a case that a main part in the first image is incomplete;

Or, the second display sub-module is configured to display a composition prompt, in response to the processed image after zoom-in having a resolution lower than a preset resolution.

In an embodiment, the first image is a current preview image in a preview window of a camera; the apparatus further includes a second display module;

The second display module is configured to display the processed image in the preview window of the camera.

In an embodiment, the second display module is specifically configured to: display the processed image with picture-in-picture form, in the preview window of the camera.

With the image processing apparatus according to an embodiment of the present disclosure, face detection is first performed on a first image and position information of each face in the first image is acquired; then it is determined whether the first image complies with a multi-person composition rule, based on the position information of each face in the first image; and, the first image is cropped based on the position information of each face in the first image to obtain a processed image, in response to the first image not complying with the multi-person composition rule. With the embodiment of the present disclosure, composition of an image is corrected with regards to an overall effect of the image, thereby improving the image quality.

In addition to the above method and apparatus, a computer-readable storage medium is provided in an embodiment of the present disclosure. The computer-readable storage medium stores instructions which, when being executed on a terminal device, cause the terminal device to implement the image processing method according to embodiments of the present disclosure.

Figure 5:
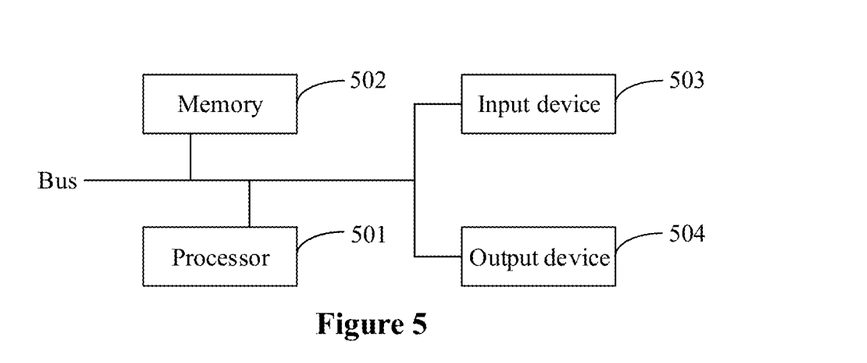
FIG. 5 is a structural block diagram of an image processing device according to an embodiment of the present disclosure.

In addition, an image processing device is provided in an embodiment of the present disclosure. As shown in FIG. 5, the image processing device may include: a processor 501, a memory 502, an input device 503 and an output device 504.

The image processing device may include one or more processors 501, and one processor is shown in FIG. 5 as an example. In some embodiments of the present invention, the processor 501, the memory 502, the input device 503 and the output device 504 may be connected by a bus or in other ways. The connection via a bus is taken as an example in FIG. 5.

The memory 502 may be used to store software programs and modules, and the processor 501 executes various functional applications and data processing of the image processing device by running software programs and modules stored in the memory 502. The memory 502 may mainly include a program storage area and a data storage area. The program storage area may store an operating system, an application program required for at least one function, and the like. Additionally, the memory 502 may include a high-speed random access memory, and may also include a non-volatile memory, such as at least one magnetic disk storage device, flash memory device, or other volatile solid state storage device. The input device 503 may be used to receive input numerical or character information, and generate signal input related to user settings and function control of the image processing device.

Specifically in this embodiment, the processor 501 loads the executable files corresponding to the processes of one or more application programs into the memory 502 according to the following instructions, and the processor 501 executes the application programs stored in the memory 502, thus to realize various functions of the image processing device.

It should be noted that, in this document, relational terms such as "first" and "second" etc. are only used to distinguish one entity or operation from another entity or operation, and do not necessarily require or imply there is such actual relationship or sequence between these entities or operations. Moreover, the terms "comprising", "comprises" or any other variation thereof are intended to encompass a non-exclusive inclusion such that a process, method, article or device that includes a list of elements includes not only those elements, but also includes other elements not explicitly listed, or elements inherent to such a process, method, article or apparatus. Without further limitation, an element defined by the phrase "comprising a . . . " does not preclude the presence of additional identical elements in a process, method, article or apparatus that includes the element.

The above descriptions are only specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments described herein, but is to be accorded the widest scope consistent with the principles and novel features disclosed herein.

The invention claimed is:

1. An image processing method applied in an electronic device with a camera and a processor, comprising:
    detecting, by the processor, whether a target object in a second image is in a vertical state, to determine, by the processor, whether the second image is in a scene horizontal state, wherein the second image is a preview image displayed in a preview window of the camera;
    rotating, by the processor, the second image to acquire a first image displayed in the preview window of the camera, in response to the second image being not in the scene horizontal state;
    performing, by the processor, face detection on the first image, and acquiring, by the processor, position information of each face in the first image;
    determining, by the processor, based on the position information of each face in the first image, whether the first image complies with a multi-person composition rule; and
    cropping, by the processor, the first image based on the position information of each face in the first image to obtain a processed image displayed in the preview window of the camera, in response to the first image not complying with the multi-person composition rule.

2. The method according to claim 1, wherein the target object comprises a plurality of sub-objects, and
the detecting whether the target object in the second image is in the vertical state, to determine whether the second image is in the scene horizontal state comprises:
detecting whether each of the plurality of sub-objects in the second image is in the vertical state, to determine whether the second image is in the scene horizontal state.

3. The method according to claim 1, wherein the target object comprises a body part and a face part,
the detecting whether the target object in the second image is in the vertical state, to determine whether the second image is in the scene horizontal state comprises:
detecting whether the body part and the face part of a same person in the second image are both in the vertical state, to determine whether the second image is in the scene horizontal state.

4. The method according to claim 1, wherein before rotating the second image to acquire the first image, the method further comprises:
acquiring an offset angle of the target object in the second image relative to a vertical direction, in response to the second image being not in the scene horizontal state; and
the rotating the second image to acquire the first image includes:
rotating the second image based on the offset angle, to acquire the first image.

5. The method according to claim 1, wherein the method further comprises:
generating a composition prompt by the processor, and displaying the composition prompt in the preview window of the camera, in a case that the first image or the processed image does not meet a correction condition.

6. The method according to claim 5, wherein the displaying the composition prompt in a case that the first image or the processed image does not meet the correction condition comprises:
displaying the composition prompt, in a case that a main part is incomplete in the first image; or,
displaying the composition prompt, in a case that the processed image after zoom-in has a resolution lower than a preset resolution.

7. The method according to claim 1, wherein the displaying the processed image in the preview window of the camera comprises:
displaying the processed image with picture-in-picture form, in the preview window of the camera.

8. An image processing device, comprising a camera, a memory, a processor, and a computer program stored on the memory and executable on the processor, wherein the processor, when executing the computer program, is configured to:
detect whether a target object in a second image is in a vertical state, to determine whether the second image is in a scene horizontal state, wherein the second image is a preview image displayed in a preview window of the camera;
rotate the second image to acquire a first image displayed in the preview window of the camera, in response to the processor determining that the second image is not in the scene horizontal state;
perform face detection on the first image, and acquire position information of each face in the first image;
determine, based on the position information of each face in the first image, whether the first image complies with a multi-person composition rule; and
crop the first image based on the position information of each face in the first image to obtain a processed image displayed in the preview window of the camera, in response to the first image not complying with the multi-person composition rule.

9. The device according to claim 8, wherein the target object comprises a plurality of sub-objects, and the processor, when executing the computer program, is further configured to implement:
detecting whether each of the plurality of sub-objects in the second image is in the vertical state, to determine whether the second image is in the scene horizontal state.

10. The device according to claim 8, wherein the target object comprises a body part and a face part, and the processor, when executing the computer program, is further configured to implement:
detecting whether the body part and the face part of a same person in the second image are both in the vertical state, to determine whether the second image is in the scene horizontal state.

11. The device according to claim 8, wherein the processor, when executing the computer program, is further configured to implement:
acquiring an offset angle of the target object in the second image relative to a vertical direction, in response to the second image being not in the scene horizontal state; and
rotating the second image based on the offset angle, to acquire the first image.

12. The device according to claim 8, wherein the processor, when executing the computer program, is further configured to implement:
generating a composition prompt by the processor, and displaying the composition prompt in the preview window of the camera, in a case that the first image or the processed image does not meet a correction condition.

13. The device according to claim 12, wherein the processor, when executing the computer program, is further configured to implement:
displaying the composition prompt, in a case that a main part is incomplete in the first image; or,
displaying the composition prompt, in a case that the processed image after zoom-in has a resolution lower than a preset resolution.

14. The device according to claim 8, wherein the processor, when executing the computer program, is further configured to implement:
displaying the processed image with picture-in-picture form, in the preview window of the camera.

15. A non-transitory computer-readable storage medium, wherein the computer-readable storage medium stores instructions which, when being executed on a terminal device with a camera and a processor, causes the terminal device to implement:
detecting, by the processor, whether a target object in a second image is in a vertical state, to determine, by the processor, whether the second image is in a scene horizontal state, wherein the second image is a preview image displayed in a preview window of the camera;

rotating, by the processor, the second image to acquire a first image displayed in the preview window of the camera, in response to the second image being not in the scene horizontal state;

performing, by the processor, face detection on the first image, and acquiring, by the processor, position information of each face in the first image;

determining, by the processor, based on the position information of each face in the first image, whether the first image complies with a multi-person composition rule; and cropping, by the processor, the first image based on the position information of each face in the first image to obtain a processed image displayed in the preview window of the camera, in response to the first image not complying with the multi-person composition rule.

\* \* \* \* \*